United States Patent [19]

Sauter

[11] 4,237,929
[45] Dec. 9, 1980

[54] PIPE MANIFOLD, ESPECIALLY FOR SUPPLY AND RETURN OF HOT WATER HEATERS

[76] Inventor: Ernst Sauter, Ebingerstr. 17, D-7475 Messstetten, Fed. Rep. of Germany

[21] Appl. No.: 941,764

[22] Filed: Sep. 13, 1978

[30] Foreign Application Priority Data

Sep. 16, 1977 [DE] Fed. Rep. of Germany ....... 2741727

[51] Int. Cl.³ .............................................. F24H 9/12
[52] U.S. Cl. ................................... 137/596; 137/360; 137/561 A; 137/594
[58] Field of Search .................... 137/360, 561 A, 594, 137/596, 883

[56] References Cited

FOREIGN PATENT DOCUMENTS 2116982 8/1974 Fed. Rep. of Germany ........... 137/594
2411570 9/1974 Fed. Rep. of Germany ........... 137/594
283348 6/1952 Switzerland ............................. 137/596

Primary Examiner—Gerald A. Michalsky
Attorney, Agent, or Firm—Blair, Brown & Kreten

[57] ABSTRACT

A pipe manifold for utilization with hot water heating systems and including substantially adjacent inlet and return flow chambers within a single elongated box and separated by an internal dividing wall. Disposed on the outside of the housing are pipe headers of various types, in particular frustoconical pipe headers, which may be cut off so that the diameter obtained matches that of a valve or pump or the like to be mounted thereto with the intent that the overall height of the apparatus is constant independently of the size of the attached device. The headers communicate with the chambers within the manifold via openings which are advantageously disposed at one or the other side of the edge of the dividing wall. A variety of embodiments is presented.

18 Claims, 12 Drawing Figures

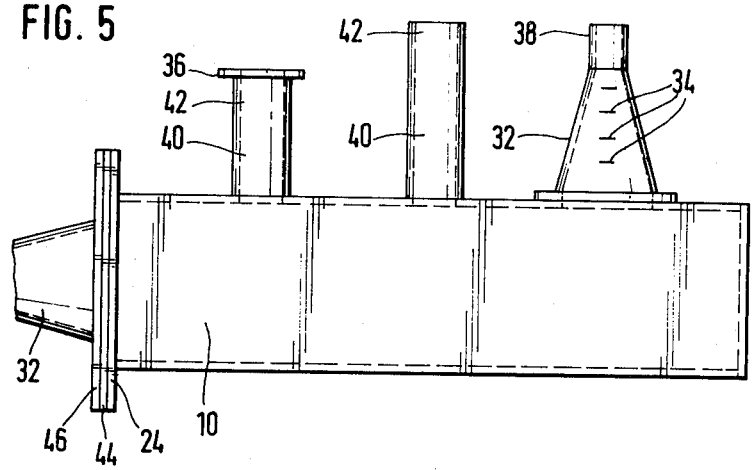
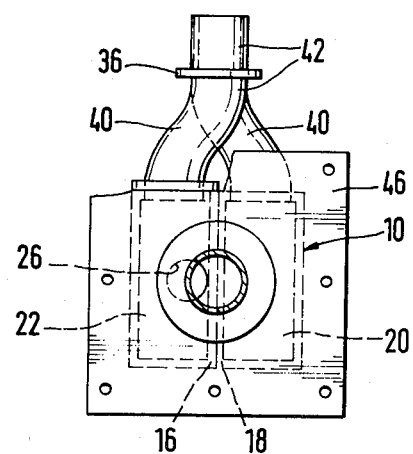
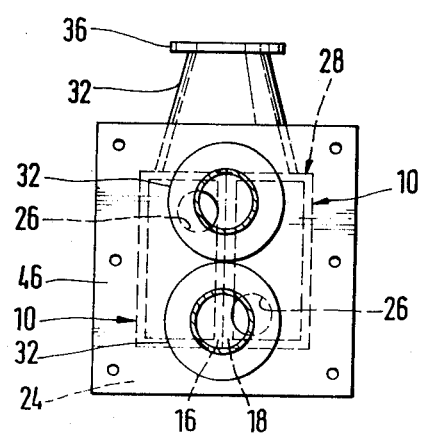

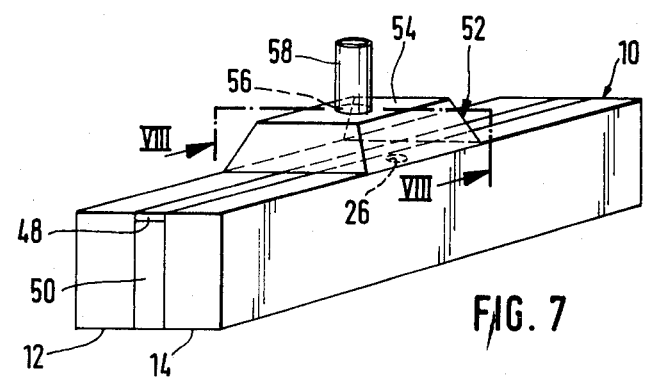
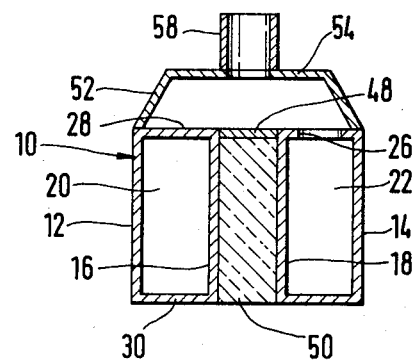
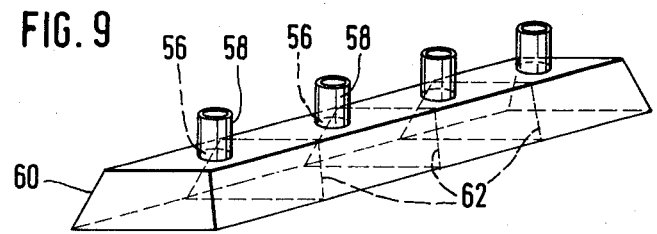

PIPE MANIFOLD, ESPECIALLY FOR SUPPLY AND RETURN OF HOT WATER HEATERS

FIELD OF THE INVENTION

The invention relates to pipe manifolds, especially for the supply and return of water in hot water heating systems. More particularly, the invention relates to a pipe manifold in which the housing is divided by a transverse wall into an admission or supply chamber and a return chamber. The chambers are supplied with external headers or extensions for attaching various pipelines.

BACKGROUND OF THE INVENTION

A pipe manifold of the general type described above is already known from the German Patent No. 2,116,982. In this known type manifold, the headers or pipe attachments are led out of the housing at one wall which is normal with respect to the transverse divider wall and the headers alternately attach directly to the outer wall of the housing and penetrate that wall, traverse the adjacent chamber and enter the opposite chamber after penetrating the transverse dividing wall. These latter headers which pass through one of the interior chambers of the housing cause a considerable degree of manufacturing difficulty and also constitute a hindrance to the flow of water in one of the interior chambers of the housing, resulting for example in a relatively high noise level.

OBJECT AND SUMMARY OF THE INVENTION

It is a principal object of the present invention to provide a pipe manifold of the general type described above but so improved as to avoid the above-described disadvantages, i.e., in particular the obstacles to the interior flow within the manifold. It is a further object of the invention to provide a pipe manifold whose construction and whose attachment to pipelines is simplified with respect to the prior art.

These and other objects are attained according to the invention by providing openings in those side walls of the pipe manifolds which are adjacent to an edge of the transverse wall and to dispose these openings to be located alternately on one or the other side of that edge. Lines are then placed in communication with the various pipe connections or headers.

The headers or pipe connectors which are in communication with the various openings may be so bent that at least their outer ends are lined up with respect to one another, i.e., lie in the same plane, or, in a preferred embodiment they can be so constructed as to overlap a region which includes openings located on either side of the edge of the transverse wall. In the latter configuration, all of the pipe headers or connectors may be identical although each of them communicates through one of the openings only with a supply chamber or a return chamber. Preferably, the cross section of the manifold housing is rectangular or square so that all pipe couplings are attached to a single wall of the housing, namely the one which makes contact with a long edge of the transverse wall. This configuration substantially simplifies the manufacture of the entire manifold. The openings in the wall through which the pipe couplings communicate with the interior chambers may be disposed alternatingly on either side of the edge of the transverse wall or may be grouped on the two sides of the transverse wall. Preferably and advantageously, the transverse wall which divides the manifold housing may be straight, thereby considerably simplifying the manufacture of the manifold. For, in that case, the entire manifold may consist of two parallel pipes of rectangular cross section one of which defines the admission or supply chamber whereas the other defines the return flow chamber and whose common wall constitutes the transverse wall of the manifold. The two rectangular pipes can be welded together to form a very compact overall manifold housing. It is also possible to dispose the openings in the side wall of the manifold housing in a straight line and to configure the transverse wall to be wavy or to have a zig-zag shape between two sequential openings. In construction, the individual pipe connectors need not be substantially wider than the width of a single opening and still can be essentially of identical form and disposed in a straight line. In this case, the special form of the transverse wall causes the connections to be alternatingly coupled to the supply chamber or to the return chamber. Other pipe connectors can be attached to the remaining external surfaces of the pipe manifold. According to one suitable proposal of the present invention, these are attached to the side opposite the one just described, i.e., the side adjacent to the opposite edge of the transverse wall, and on one or both sides of that edge. The outer ends of those pipe connectors will then also lie in the plane defined by the central axes of the first described pipe connectors. The additional connectors can be used for the supply and return of the heating medium or the like. This type of construction provides the optimum use of space and a very orderly disposition of the systems connected to the pipe manifold.

If it is necessary to attach the pipe manifold to, for example, curved walls of buildings in order to save space, the entire manifold may be bent in the longitudinal direction without requiring any alteration of any of its parts.

Suitably the pipe connectors are configured in the manner of truncated cones. These connectors are attached to the walls of the pipe manifold with their larger diameter which must be at least large enough so that, when the pipe connector is centrally attached to the housing, the connector completely covers the opening lying beneath it regardless of whether that opening leads to the inlet chamber or to the return flow chamber. The maximum diameter of each pipe connector of course may not exceed the overall width of the housing. It is a particular object of the present invention to provide that when pumps, mixture valves or shut-off valves are attached to the pipe manifold, their overall extent is substantially the same regardless of their actual size. This object is attained by marking the outside of each of the pipe connectors in predetermined lengths so that the pipe connector may be cut off at a particular length having the desired cross section. The location of the markings and the cone angle of the pipe connectors is such that the length of connector which remains when it is severed at one of the markings, when added to the height of a valve or pump, is substantially the same for any size pump or valve provided that the coupling cross section of that valve or pump corresponds to the cross section which obtains when the pipe connector is cut at the particular marking. In this manner, it is possible to use relatively simple pipe connectors and still obtain a very excellent adaptation of the cross sections and the overall heights to the size of any of the parts or mechanisms which are to be attached to the pipe couplings.

According to a further exemplary embodiment of the invention, the pipe connectors may also be parallelepipeds or truncated pyramids having a cover surface which is parallel to a wall of the pipe manifold and the cover surface would have an opening for attaching a pipe connector of varying dimensions. The choice of the various configurations of the pipe connector produces a very compact system in which a wide choice is possible for the form, size and position of the openings within the pipe manifold. By choosing the shape and the height of the pipe couplings to be attached to the headers it is possible to control the overall height of the connected system.

The pipe couplings or boxes may be large enough to cover the entire width of the top of the manifold housing and they may be contiguous in the longitudinal extent of the housing. This construction is a very orderly and visually attractive disposition. However, it is also possible to make the attachment boxes out of the single overall box which is subdivided by internal walls. Such a single box is very simple to attach.

In one suitable embodiment of the invention, the single transverse wall within the housing may be replaced by two parallel and separated transverse walls between the antichamber and the return flow chamber. The advantage of having two separated walls is that the hot fluid medium which enters the chamber does not exchange heat with the somewhat cooler return flow medium. Advantageously, the space between the two transverse walls may be filled with a thermally insulating material. Even in this configuration, however, the manifold housing may be constructed very simply from two parallel pipes of rectangular cross section. The adjacent side walls of these rectangular pipes are then welded together at some distance from one another by means of connecting bridges. The extent of these bridges in the longitudinal direction of the manifold housing must be at least large enough so that they close off the part of the pipe connectors which lies between the two rectangular pipes. It is also possible to provide a single connecting bridge which extends over the entire length of the pipe manifold.

When using pipe manifolds of the type to which this invention relates, it is often desirable to be able to drain individual connected pipelines or sub-groups temporarily for purposes of repair or for replacement. In order to permit this drainage, the invention provides that the manifold housing is surrounded at least partially by a drainage trough or gutter which defines a closed box except for an access slot which preferably extends over the entire length of the housing. This construction is very compact because it is an externally closed box accessible only through a slot.

It is suitable if the rear area of the drainage trough and the housing are separated by a gap through which drainage pipes may be led into the trough which are connected to the pipe couplings and the associated pipelines. The drainage trough may be emptied in this manner through the pipelines connected to the pipe manifold. Furthermore, this gap provides a desirable separation of the manifold from the walls which may be attached.

The drainage pipes have shut-off valves which may preferably be disposed in the drainage gutter or trough and which may be accessible through the aforementioned slot. These shut-off valves are thus easily accessible and yet practically invisible so that they do not detract from the overall closed and attractive appearance of the pipe manifold.

The construction of a manifold composed of two pipes and a drainage trough is simplified if the drainage trough has vertical walls at its ends which at the same time serve to close off the ends of the pipe manifold.

The invention will be better understood as well as further objects and advantages thereof become more apparent from the ensuing detailed description of a number of preferred embodiments taken in conjunction with the drawing.

BRIEF DESCRIPTION OF THE DRAWING

FIG. 5 is a side view of a second exemplary embodiment of the pipe manifold;

FIG. 6 is an end view of the pipe manifold shown in FIG. 5;

FIG. 6a is an end view of a third exemplary embodiment of the invention;

FIG. 7 is an oblique view of a fourth exemplary embodiment of the invention;

FIG. 8 is a vertical section along the line VIII—VIII in FIG. 7;

FIG. 9 is a schematic perspective view of a connecting box to be attached to the pipe manifold;

DESCRIPTION OF THE PREFERRED EMBODIMENTS

Figure 1:
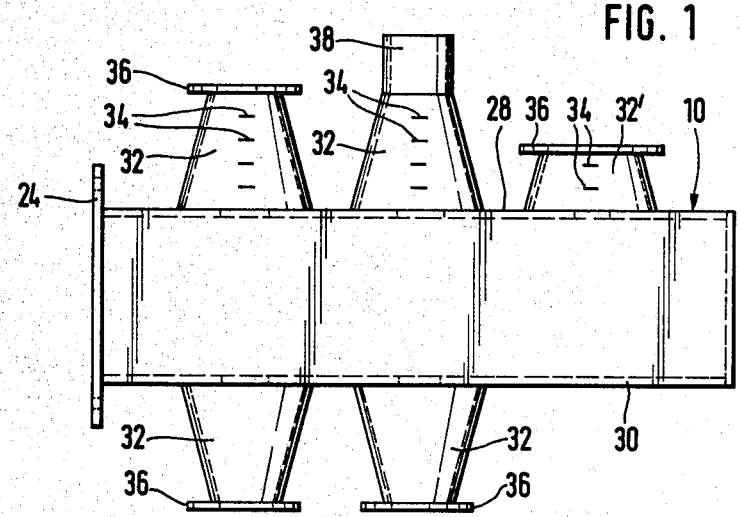
FIG. 1 is a side view of a first exemplary embodiment of the pipe manifold according to the invention.
Figure 3:
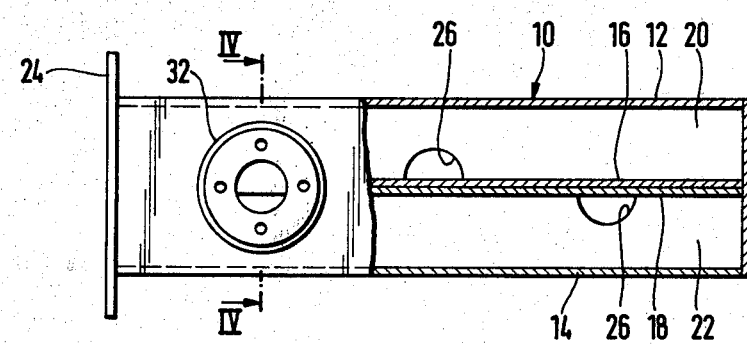
FIG. 3 is a partial sectional bottom view of the pipe manifold of FIG. 1.
Figure 2:
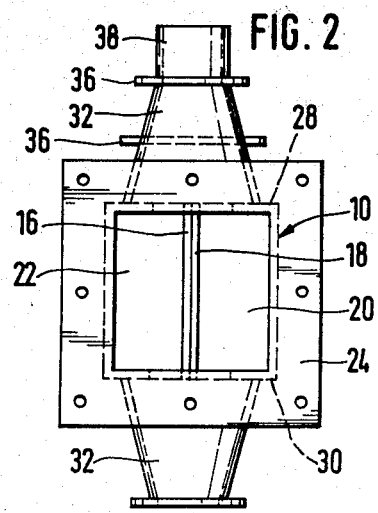
FIG. 2 is an end view of the pipe manifold illustrated in FIG. 1.
Figure 4:
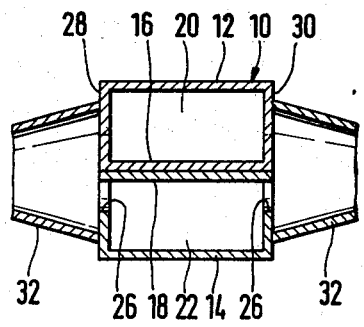
FIG. 4 is a section along the line IV—IV in FIG. 3.

In the first embodiment of the invention, illustrated in FIGS. 1-4, the pipe manifold 10 is shown to be an elongated rectangular parallelepiped, constructed from two parallel pipes 12 and 14 each of which has a side wall 16 or 18 which lie adjacent one another and may be welded together. The walls 16 and 18 jointly define the transverse wall of the pipe manifold which divides it into an inlet chamber 20 and a return flow chamber 22. The right end of the pipe manifold 10 illustrated in FIGS. 1 and 3 is closed while the left end is open and shows a flange 24 which may be covered up with a blind cover if there are sufficient connecting pipes on the housing but to which another similar pipe manifold 10 may be attached by welding or bolting if the system is to be enlarged. A similar flange may also be provided at the other end of the housing and, in this manner, an overall system of any desired size may be constructed.

In the vicinity of the edge of the transverse wall 16, 18, the top 28 and the bottom 30 of the pipe manifold housing 10 are provided with openings 26. These openings 26 are disposed in the top wall 28 and in the bottom wall 30 so as to alternately lie on either side of the transverse walls 16,18. Mounted to the top wall 28 and the bottom wall 30 are pipe connectors 32, in this case shaped in the manner of truncated cones with a constant cone angle and attached to the housing, for example, by welding. The pipe connectors are so sized and disposed as to overlap far enough on both sides of the transverse wall 16 so as to cover at least the width of one of the openings 26 disposed on either side of the transverse wall. Accordingly, the pipe connections 32 may all have the same size and shape and are attached to the housing in a straight longitudinal line, i.e., congruently with respect to the axial extent of the housing. Furthermore, the pipe connections 32 attached to the bottom of the housing lie in a plane defined by the central axes of the connections mounted on top.

Figure 11:
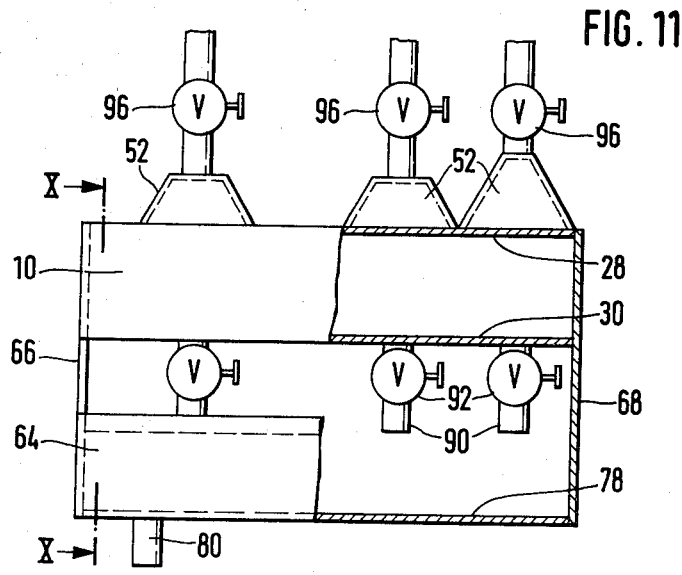
FIG. 11 is a partially broken front view of the apparatus illustrated in FIG. 10.

The outer surface of the pipe connections 32 is provided with several markings 34 whose position is determined in consideration of the conical angle of the pipe connectors. The distance between markings is so chosen that when a pipe connector 32' is shortened, for example as shown in the right portion of FIG. 1, along a marking 34 (which, in the shown example, is the second marking from the top) the remaining height of the pipe connector 32' is such that the opening cross section which it will acquire is matched to the inlet orifice diameter of an attached pump or valve having standard dimensions so that the actuating valve of such a pump or apparatus will be located at the same overall height with respect to the manifold housing 10 as would be the case if a correspondingly smaller pump or device is attached to the unshortened pipe connector 32 in FIG. 1. While the unshortened connectors 32 are higher, their opening cross section is smaller as is the size of the pump or valve attached to them, so that the overall height of the apparatus from the point of attachment on the manifold up to the location of the actuating plane is the same as will be the case if a larger apparatus or pump is attached to a shortened pipe connector 32 as is illustrated in the example of FIG. 11. By suitable choice of the conical angle and of the position of the markings 34, it is possible to obtain a very practical simple and reliable installation and mounting of the pipe manifold and its associated apparatus. The ends of the pipe connectors 32 may be provided in known manner with connecting flanges 36 or threads 38 by welding for example.

The pipe connectors 32 attached to the bottom 30 of the housing 10 serve primarily as the main supply or return line for the heating medium while the connectors or couplings 32 attached to the top wall 28 serve primarily for the attachment of supply and return lines of individual systems and devices, for example heaters or other sub-groups.

The second exemplary embodiment illustrated in FIGS. 5 and 6 is different from the first embodiment in that differently shaped pipe connectors 40 are used, in this case having the shape of bent pipe couplers with constant cross section. The cross section of the couplers 40 is somewhat larger than the largest width of a single opening 26 and the connectors are bent in the manner illustrated in FIG. 6 in order that their outer ends 42 lie in a straight line with respect to the long axis of the housing 10. As shown in FIG. 5 there may be connected to the pipe couplers 4 a truncated conical connector 32 having the previously defined markings 34 which is used in the manner illustrated with respect to the first example of FIGS. 1 and 4. It is also possible, depending on the use and the requirements of assembly, to use different and variously configured pipe couplings in combination.

In the second embodiment according to FIGS. 5 and 6, the pipe couplers 32 previously attached to the bottom wall 30 are absent. Their place is taken by a coupler 32 of truncated conical shape which is attached to a further flange 46 which is either bolted or welded to the flange 24 with interposition of a sealer plate 44 which seals the housing 10. The coupler 32 communicates via an opening 26 in the sealer plate 44 with the inlet chamber 20 of the pipe manifold 10. In other respects, the second embodiment is identical to that illustrated in FIGS. 1–4. A third embodiment, which illustrates the possibility of combining various pipe couplers with the pipe manifold 10, is illustrated in FIG. 6a. This figure shows substantially the same construction as FIG. 6 except that a truncated conical pipe coupler 32 is attached to the top 28 of the manifold 10 whereas two identical couplers 32 are attached, one on top of the other, on the flange 46 and these communicate through openings 26 in the sealer plate 44 with the inlet chambers 20 or the return flow chamber 22. The axes of the couplers 32 lie in the same plane as those of the couplers 32 attached to the top wall 28.

In a fourth exemplary embodiment of the invention illustrated in FIGS. 7 and 8, the pipe manifold also consists of two parallel rectangular pipes 12 and 14. However, these two pipes are disposed at a distance from one another and are rigidly connected by a bridge 48 between the tops of the pipes 12 and 14. The gap between the adjacent walls 16 and 18 is filled with a thermally insulating material 50. Attached to the top of the manifold housing is a pipe coupler 52 in the shape of a truncated pyramid whose open base covers the entire width of the manifold housing including the insulating layer 50. The return flow chamber 22 defined by the pipe 14 communicates via an opening 26 with the interior of the pipe coupler 52. Furthermore, the top wall 54 of the pipe coupler 52 has an opening 56 into which is welded a cylindrical pipe stud 58 of the desired length. Even though the illustration only shows a single connector 52, it will be clear to a person skilled in the art that other similar or differently shaped pipe couplers or headers may be attached according to the invention to the manifold and may be combined with the one which is illustrated so as to satisfy the actual requirements in practice. In order to simplify the drawing, other openings 26 and other elements of the apparatus, similar to those previously illustrated and discussed, are omitted from FIGS. 7 and 8. In this embodiment, the end faces of the pipes 12 and 14 are shown closed. However, they may also be opened and provided with a flange 24 and attachments according, for example, to the illustrations of FIGS. 6 or 6a.

Instead of providing adjacent pipe couplers 52 along the axial extent of the manifold housing, it is also possible, as illustrated in a fifth embodiment according to FIG. 9, to provide a single coupler box 60 in the general shape of a truncated pyramid so as to cover essentially the entire top surface of the manifold housing. The box 60 is subdivided internally by vertical walls 62 into individual connecting chambers each of which has an opening 56 into which are inserted pipe studs 58 of the desired diameter. In a manner not shown, each of the individual chambers defined by a wall 62 communicates through openings 26, not shown, either with an inlet chamber 20 or the return flow chamber 22 of the manifold housing.

Figure 10:
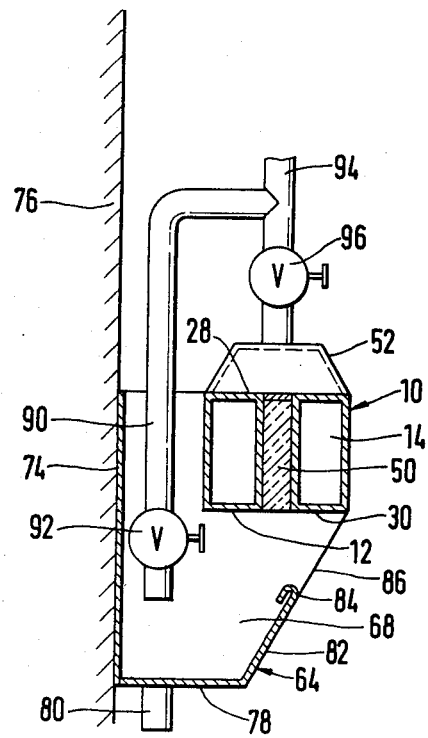
FIG. 10 is a vertical section through a drainage trough connected integrally with the pipe manifold and along the line X—X in FIG. 11.

FIGS. 10 and 11 represent an illustration of combining a pipe manifold housing 10 with a drainage trough or gutter 64 which extends over the entire length of the housing 10 and is closed at the end by vertical walls 66 and 68, respectively. The wall 68 can also serve to close the end face of the manifold housing 10 so that a single closure wall is disposed at the end face of the manifold housing and the drainage trough. Drainage troughs may also be bolted or welded to the housing 10 itself as illustrated in FIGS. 6 and 6a. The rear vertical surface 74 of the drainage trough 64 is shown attached to a wall 76 of the building where it may be fastened in a suitable manner. The pipe manifold housing 10 is thus located at some distance from the rear surface 74, thereby defining an open gap between the housing 10 and the wall 74.

Located in the bottom 78 of the drainage trough 64 and closable in a manner not shown, is a drainage stud 80 connected to suitable pipelines.

Extending obliquely upwardly from the bottom 78 of the trough is a front surface 82 with a crimped edge 84 which, together with the bottom 30 of the manifold housing 10, defines an access slot 86 which makes the interior of the drainage trough accessible for cleaning and the like. The drainage trough 64 together with the pipe manifold housing 10 forms a compact box-like construction which is simply attached to the masonry wall 76.

The space which is defined between the rear surface 74 and the manifold housing 10 is used to admit drainage pipes 90 to the interior of the drainage trough 64. The drainage pipes 90 are then connected to a pipe 94 coupled to the manifold housing 10 at a point further from the manifold housing than the location of the shut-off valve 96. The drain pipes 90 are provided with shut-off valves 92 actually located in the interior of the drainage trough 64 and thus invisible from the outside, but easily accessible through the opening 86. By closing the valves 96 and opening the valves 92, any device or system attached to the pipes 94 may be emptied by draining its contents into the drainage trough 64.

The foregoing relates to preferred exemplary embodiments of the invention, it being understood that other embodiments and variants thereof are possible within the spirit and scope thereof.

I claim:

1. A pipe manifold, especially for use with hot water heating systems, comprising:
   a single manifold housing defining a substantially closed elongated box having sides defining walls;
   a dividing wall, disposed within said housing so as to divide the interior volume of said housing into an inlet chamber and a return flow chamber;
   said dividing wall having edges that meet opposed walls of said housing;
   a plurality of pipe headers mounted flush on said housing over both chambers, each serving to communicate with one of said chambers, and there being defined on at least one said wall of said housing adjacent to said edges of said dividing wall a plurality of longitudinally spaced openings located on both sides of said edge, for permitting communication between the interior of said housing and said pipe headers whereby said pipe headers being flush on said housing do not constrict flow cross section nor raise manufacturing costs.

2. A pipe manifold according to claim 1, wherein said openings are alternately located on one and the other side of said edge.

3. A pipe manifold according to claim 1, wherein said manifold housing is defined by two parallel pipes of rectangular cross section disposed adjacent one another; whereby two adjacent walls of said pipes define said dividing wall in said housing.

4. A pipe manifold according to claim 1, wherein said openings are disposed on said housing along both of the longitudinal edges of said dividing wall.

5. A pipe manifold according to claim 1, wherein said pipe headers are of a cross section which is greater than and covers the extent of said openings in both directions as measured from the edge of said dividing wall.

6. A pipe manifold according to claim 1, wherein said pipe headers have the shape of frusto-conical pipe studs.

7. A pipe manifold according to claim 6, wherein the cone angle of the pipe studs is so chosen that when the pipe stud is coupled to an associated hydraulic device with matching cross section, the overall offstanding extent of said pipe header and said device is constant independently of the individual size of said device.

8. A pipe manifold according to claim 1, wherein there are provided on the exterior surface of said pipe headers markings at the locations in which a diameter of said pipe header corresponds to a standardized industrial cross section.

9. A pipe manifold according to claim 1, wherein said pipe headers are frusto-pyramidal boxes, the top of said boxes having a closed surface defining an opening in which is inserted a pipe stud of selectable dimensions.

10. A pipe manifold according to claim 9, wherein there is provided a plurality of longitudinally adjacent boxes defining said pipe headers.

11. A pipe manifold according to claim 10, wherein said boxes are defined by a single overall box internally divided by intermediate walls into separate chambers.

12. A pipe manifold according to claim 1, wherein said dividing wall is defined by two parallel walls separated from one another by a finite distance.

13. A pipe manifold according to claim 12, wherein said distance between said parallel dividing walls is filled with a thermally insulating material.

14. A pipe manifold according to claim 12, wherein said manifold housing is defined by two parallel pipes of rectangular cross section and wherein adjacent walls of said parallel pipes are separated by a finite distance and are fixedly connected by connecting brackets to prevent communication between the volume defined between said dividing walls and said pipe headers.

15. A pipe manifold according to claim 1, further comprising a drainage trough at least partially surrounding said manifold housing and defining therewith a substantially integral container with the exception of an access opening defined between said drainage trough and said manifold housing for permitting access to the interior of said drainage trough.

16. A pipe manifold according to claim 15, wherein in a rear wall of said drainage trough is separated from an adjacent wall of said manifold housing for providing space for drainage pipes leading into said drainage trough, said drainage pipes being connected to piping coupled to said pipe headers.

17. A pipe manifold according to claim 16, further comprising shut-off valves connected to said drainage pipes, said shut-off valves being accessible through said space defined between said drainage trough and said manifold housing.

18. A pipe manifold according to claim 15, wherein said drainage trough has vertical side walls which simultaneously serve as closure side walls of said manifold housing.

* * * * *